United States Patent
Yasuda

(10) Patent No.: US 10,340,728 B2
(45) Date of Patent: Jul. 2, 2019

(54) ELECTRONIC DEVICE AND METHOD FOR CHARGING A BATTERY OF THE ELECTRONIC DEVICE

(71) Applicant: KYOCERA CORPORATION, Kyoto (JP)

(72) Inventor: Tomoaki Yasuda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/568,774

(22) PCT Filed: Mar. 31, 2016

(86) PCT No.: PCT/JP2016/060672
§ 371 (c)(1),
(2) Date: Oct. 23, 2017

(87) PCT Pub. No.: WO2016/170949
PCT Pub. Date: Oct. 27, 2016

(65) Prior Publication Data
US 2018/0090980 A1    Mar. 29, 2018

(30) Foreign Application Priority Data

Apr. 24, 2015 (JP) .................................. 2015-088978

(51) Int. Cl.
*H02J 7/00* (2006.01)
*H02J 7/04* (2006.01)
(Continued)

(52) U.S. Cl.
CPC ............ *H02J 7/047* (2013.01); *H01M 10/46* (2013.01); *H01M 10/48* (2013.01); *H02J 7/025* (2013.01);
(Continued)

(58) Field of Classification Search
CPC .. H02J 7/047; H02J 7/045; H02J 7/025; H02J 7/0052; H02J 50/10; H02J 50/12; H02J 50/80; H01M 10/46; H01M 10/48
See application file for complete search history.

(56) References Cited

U.S. PATENT DOCUMENTS

| 4,914,393 | A | * | 4/1990 | Yoshido | G01R 31/3648 |
| | | | | | 320/DIG. 21 |
| 5,410,238 | A | * | 4/1995 | Ishizuka | H02J 7/0091 |
| | | | | | 320/150 |

(Continued)

FOREIGN PATENT DOCUMENTS

JP        2008-131812 A    6/2008

OTHER PUBLICATIONS

International Search Report dated Jun. 21, 2016, in corresponding Japanese International Application No. PCT/JP2016/060672 with Statement of Relevance of Non-English References.

*Primary Examiner* — Naum Levin
(74) *Attorney, Agent, or Firm* — Duane Morris LLP

(57) ABSTRACT

A temperature detector detects a temperature of a battery. A charging unit charges the battery. A power reception coil receives a first electric power transmitted in a contactless manner from a power transmission coil of a contactless charging device. A supplying unit supplies the charging unit with a second electric power on the basis of the first electric power. A setting unit sets a supply current to be supplied from the supplying unit to the charging unit. A determination unit determines whether the battery is continuously charged. The setting unit sets the supply current to a value larger than a settable minimum value regardless of the temperature of the battery when the charging unit starts charging the battery on the basis of the second electric power, and reduces the supply current as the temperature is higher when the deter- (Continued)

mination unit determines that the battery is continuously charged.

9 Claims, 8 Drawing Sheets

(51) Int. Cl.
  *H01M 10/48* (2006.01)
  *H02J 50/10* (2016.01)
  *H01M 10/46* (2006.01)
  *H02J 7/02* (2016.01)
  *H02J 50/40* (2016.01)
  *H02J 50/12* (2016.01)
  *H02J 50/80* (2016.01)

(52) U.S. Cl.
  CPC .............. *H02J 7/045* (2013.01); *H02J 50/10* (2016.02); *H02J 7/0052* (2013.01); *H02J 50/12* (2016.02); *H02J 50/40* (2016.02); *H02J 50/80* (2016.02); *H02J 2007/0062* (2013.01)

(56) References Cited

U.S. PATENT DOCUMENTS

| | | | |
|---|---|---|---|
| 8,482,250 B2* | 7/2013 | Soar | H01F 38/14 320/109 |
| 9,331,520 B2* | 5/2016 | Terry | H02J 5/005 |
| 9,356,461 B2* | 5/2016 | Howard | H02J 7/007 |
| 9,973,039 B2* | 5/2018 | Morreale | H02J 17/00 |
| 2013/0162200 A1* | 6/2013 | Terry | H02J 5/005 320/108 |
| 2013/0162220 A1* | 6/2013 | Iijima | H02J 7/0052 320/137 |
| 2014/0084856 A1* | 3/2014 | Howard | H02J 7/007 320/108 |

* cited by examiner

F I G . 8
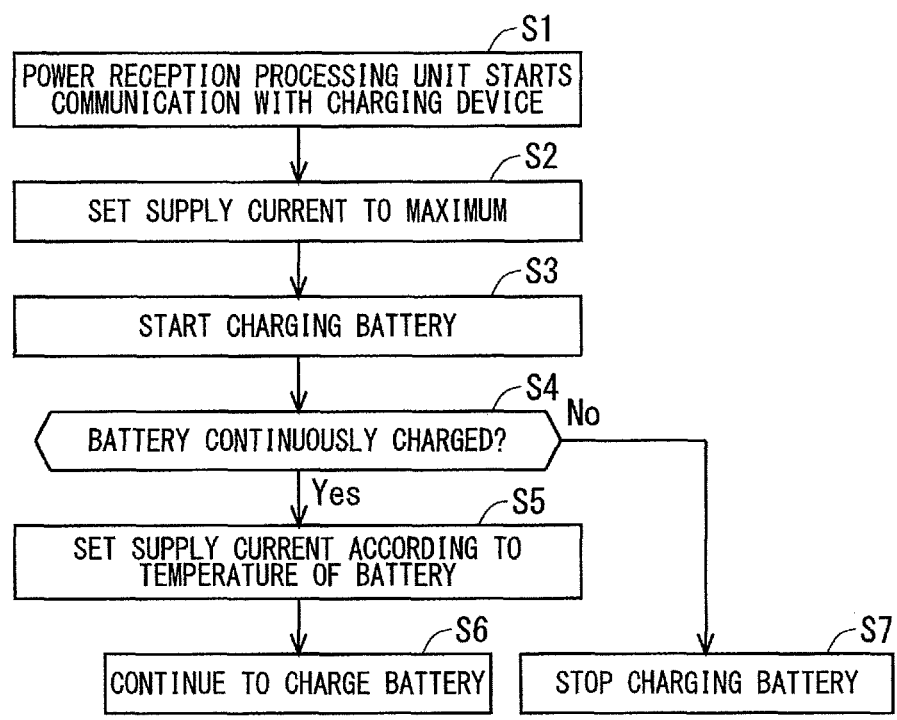

F I G . 9
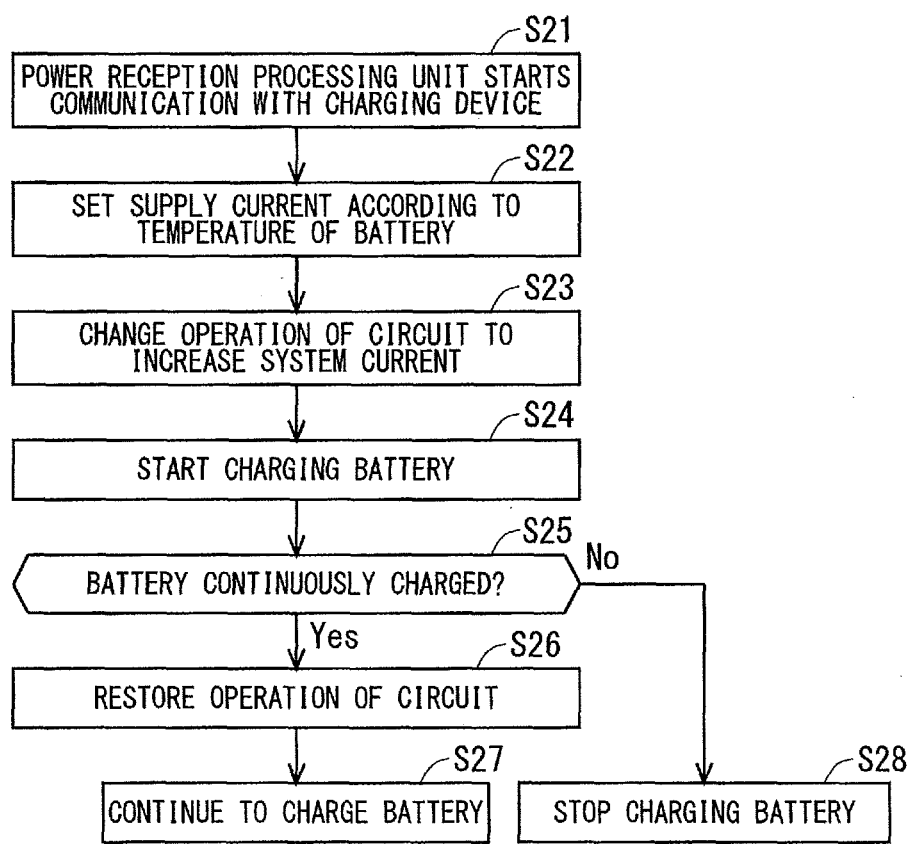

ant application claims the priority right of Japa-
ELECTRONIC DEVICE AND METHOD FOR CHARGING A BATTERY OF THE ELECTRONIC DEVICE

CROSS REFERENCE

The present application claims the priority right of Japanese Patent Application No. 2015-088978 filed on Apr. 24 2015 and incorporates herein the entire disclosure of the application for reference.

TECHNICAL FIELD

The present invention relates to charging a battery of an electronic apparatus.

BACKGROUND ART

Various techniques on charging a battery of an electronic apparatus have conventionally been disclosed.

SUMMARY

An electronic apparatus and a charging method are disclosed. According to an embodiment, the electronic apparatus includes a battery, a temperature detector, a charging unit, a power reception coil, a supplying unit, a setting unit, and a determination unit. The temperature detector detects a temperature of the battery. The charging unit charges the battery. The power reception coil receives a first electric power transmitted in a contactless manner from a power transmission coil of a contactless charging device. The supplying unit supplies the charging unit with a second electric power on the basis of the first electric power. The setting unit sets a supply current to be supplied from the supplying unit to the charging unit. The determination unit determines whether the battery is continuously charged. The setting unit sets the supply current to a value larger than a settable minimum value regardless of the temperature when the charging unit starts charging the battery on the basis of the second electric power, and reduces the supply current as the temperature is higher when the determination unit determines that the battery is continuously charged.

According to an embodiment, the electronic apparatus includes a predetermined circuit, a battery, a charging unit, a power reception coil, a supplying unit, a controller, and a determination unit. The charging unit charges the battery, and supplies the predetermined circuit with a first electric power. The power reception coil receives a second electric power transmitted in a contactless manner from a power transmission coil of a contactless charging device. The supplying unit supplies the charging unit with a third electric power on the basis of the second electric power. The controller controls the predetermined circuit. The determination unit determines whether the battery is continuously charged. The controller changes an operation of the predetermined circuit so that a consumption current of the predetermined circuit increases when the charging unit starts charging the battery on the basis of the third electric power, and then restores the operation of the predetermined circuit when the determination unit determines that the battery is continuously charged.

According to an embodiment, the charging method is a method for charging a battery on the basis of a first electric power transmitted in a contactless manner from a contactless charging device, the method being performed by an electronic apparatus including the battery. The charging method includes: detecting a temperature of the battery; receiving the first electric power from a power transmission coil of the contactless charging device by a power reception coil of the electronic apparatus; supplying a charging unit with a second electric power on the basis of the first electric power, the charging unit charging the battery; setting a supply current to be supplied to the charging unit; and determining whether the battery is continuously charged. In the charging method, the supply current is set to a value larger than a settable minimum value regardless of the temperature when the battery starts to be charged on the basis of the second electric power, and the supply current is reduced as the temperature is higher when it is determined that the battery is continuously charged.

According to an embodiment, the charging method is a method for charging a battery on the basis of a first electric power transmitted in a contactless manner from a contactless charging device, the method being performed by an electronic apparatus including the battery. The charging method includes: supplying a predetermined circuit of the electronic apparatus with a second electric power; receiving the first electric power from a power transmission coil of the contactless charging device by a power reception coil of the electronic apparatus; supplying a charging unit with a third electric power on the basis of the first electric power, the charging unit charging the battery; controlling the predetermined circuit; and determining whether the battery is continuously charged. In the charging method, an operation of the predetermined circuit is changed so that a consumption current of the predetermined circuit increases when the battery starts to be charged on the basis of the third electric power, and then the operation of the predetermined circuit is restored when it is determined that the battery is continuously charged.

BRIEF DESCRIPTION OF DRAWINGS

FIG. 8 illustrates a flowchart showing an example of operations of the electronic apparatus.

FIG. 9 illustrates a flowchart showing an example of operations of the electronic apparatus.

DESCRIPTION OF EMBODIMENTS

Embodiment 1

[Overall Configuration of Electronic Apparatus System]

Figure 1:
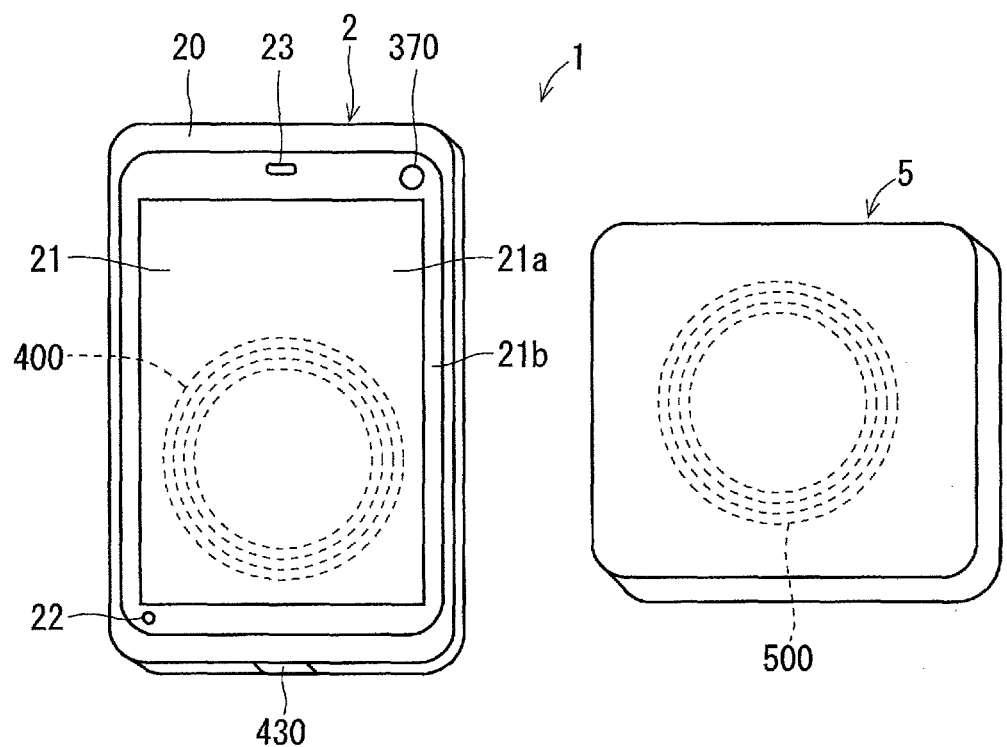
FIG. 1 schematically illustrates an example of a configuration of an electronic apparatus system.

FIG. 1 schematically illustrates an example of a configuration of an electronic apparatus system 1. In the example of FIG. 1, the electronic apparatus system 1 includes an electronic apparatus 2 and a contactless charging device 5. The contactless charging device 5 can perform contactless charging of a battery of the electronic apparatus 2. The electronic apparatus 2 is, for example, a mobile phone such as a smartphone. The electronic apparatus 2 can communicate with another communication apparatus via, for example, a base station and a server. Contactless charging is also referred to as "wireless charging" or "non-contact charging".

Figure 2:
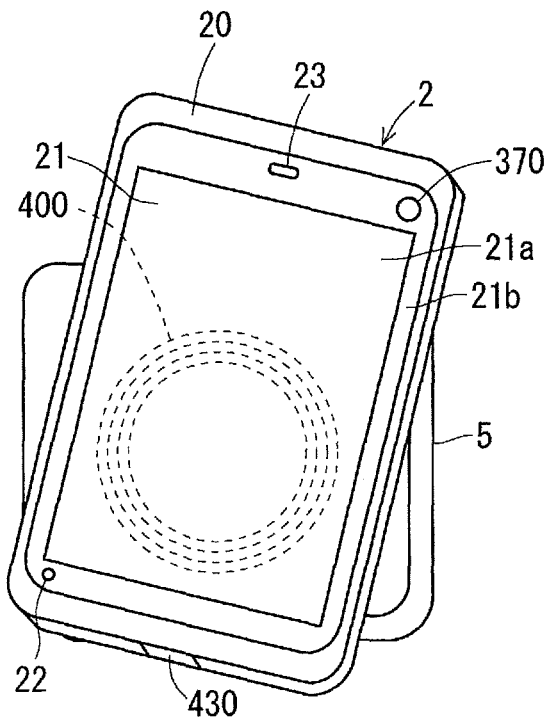
FIG. 2 illustrates an example of a state where the electronic apparatus is placed on a contactless charging device.

Inside the contactless charging device 5 is provided a power transmission coil 500 that can transmit electric power to the electronic apparatus 2. Inside the electronic apparatus 2 is provided a power reception coil 400 that can receive a first electric power transmitted from the power transmission coil 500 in a contactless manner. The battery of the electronic apparatus 2 is charged on the basis of the first electric power supplied from the power transmission coil 500 to the power reception coil 400. FIG. 2 illustrates a state where the electronic apparatus 2 is placed on the contactless charging device 5. As illustrated in FIG. 2, the contactless charging device 5 charges the battery of the electronic apparatus 2 with the electronic apparatus 2 being placed on the contactless charging device 5. The contactless charging device 5 is also referred to as a "charging stand". The contactless charging device 5 may be simply referred to as a "charging device 5" hereinafter.

Although FIGS. 1 and 2 exemplify the charging device 5 capable of mounting one electronic apparatus 2 thereon, some charging devices 5 can mount a plurality of electronic apparatuses 2 thereon. Such a charging device 5 can charge a plurality of batteries of the respective electronic apparatuses 2 at the same time. Besides, the charging device 5 can charge not only batteries of mobile phones such as smartphones but also batteries of other types of electronic apparatuses.

Contactless charging of the battery of the electronic apparatus 2 by the charging device 5 is performed in conformity with, for example, the standard referred to as Qi. Qi is the international standard developed by the WPC (Wireless Power Consortium). Contactless charging of the battery of the electronic apparatus 2 by the charging device 5 may conform to other standards, such as the standard defined by the PMA (Power Matters Alliance).

[External Appearance of Electronic Apparatus]

Figure 3:
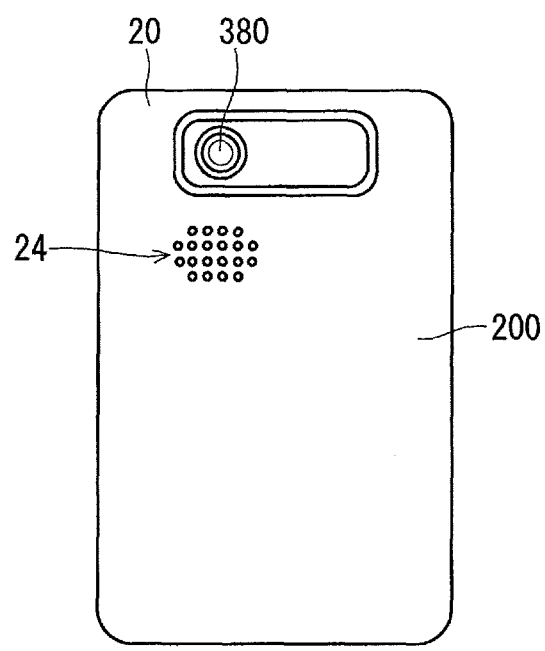
FIG. 3 is a rear view schematically illustrating an example of an external appearance of the electronic apparatus.

FIG. 3 is a rear view schematically illustrating an example of an external appearance of the electronic apparatus 2. As illustrated in FIGS. 1 to 3, the electronic apparatus 2 includes a cover panel 21 located on the front surface of the electronic apparatus 2, and an apparatus case 20 to which the cover panel 21 is attached. The cover panel 21 and the apparatus case 20 form an external portion of the electronic apparatus 2. The electronic apparatus 2 is shaped like, for example, an approximately rectangular plate in a plan view.

The cover panel 21 includes a transparent display area (may also be referred to as a "display window") 21a transmitting the display of a display 32 to be described later. The display area 21a is, for example, rectangular in a plan view. The visible light output from the display 32 passes through the display area 21a and is emitted outside of the electronic apparatus 2. The user of the electronic apparatus 2 can visually recognize information displayed on the display 32 from the outside of the electronic apparatus 2 through the display area 21a. Most of a peripheral portion 21b surrounding the display area 21a in the cover panel 2 is black because, for example, a film has been applied thereto. Thus, most of the peripheral portion 21b is a non-display portion that does not transmit the display of the display 32.

A touch panel 33 to be described later is attached to the rear surface of the cover panel 21. Then, the display 32 is attached to the main surface of the touch panel 33 that is opposite to the main surface on the cover panel 21 side. In other words, the display 32 is attached to the rear surface of the cover panel 21 through the touch panel 33. The user of the electronic apparatus 2 can provide various instructions to the electronic apparatus 2 by manipulating the display area 21a of the cover panel 2 using, for example, the finger.

In the examples of FIGS. 1 and 2, a lower end and an upper end of the cover panel 21a are perforated with a microphone hole 22 and a receiver hole 23, respectively. Provided at the upper end of the cover panel 21 is a front-surface-lens transparent part 370 through which an imaging lens of a front imaging unit 37 to be described later can be visually recognized from the outside of the electronic apparatus 2. On a lower lateral surface of the apparatus case 20 is provided a charging connector 430. For example, a USB (Universal Serial Bus) cable is connected to the charging connector 430. The charging connector 430 is supplied with the external power through the USB cable. The electronic apparatus 2 can charge the battery not only with the first electric power supplied from the charging device 5 but also with the external power supplied through the charging connector 430.

In the example of FIG. 3, a rear surface 200 of the apparatus case 20 is perforated with speaker holes 24. Provided at an upper end of the rear surface 200 of the apparatus case 20 is a rear-surface-lens transparent part 380 through which an imaging lens of a rear imaging unit 38 to be described later can be visually recognized from the outside of the electronic apparatus 2.

[Electrical Configuration of Electronic Apparatus]

Figure 4:
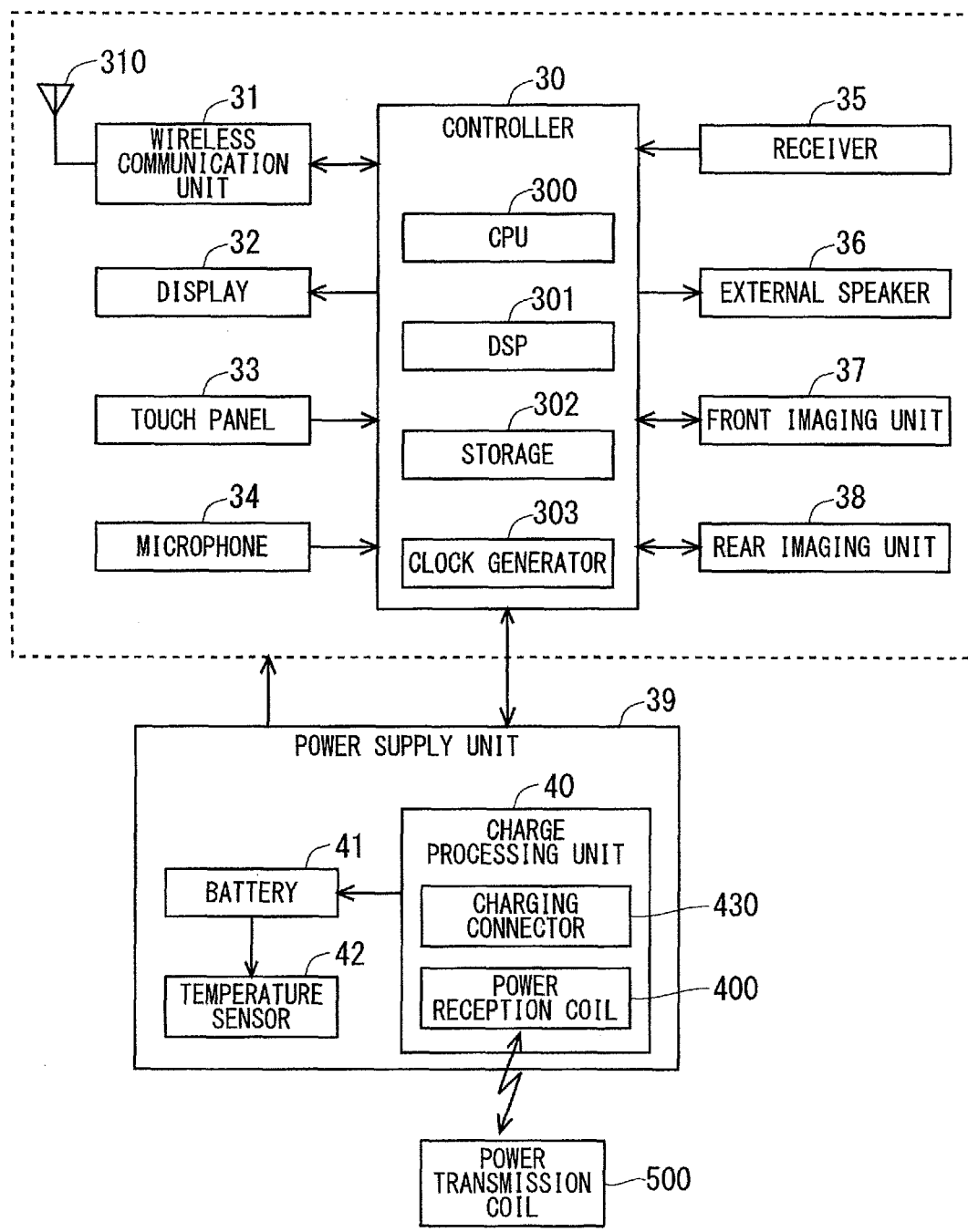
FIG. 4 illustrates an example of an electrical configuration of the electronic apparatus.

FIG. 4 illustrates a block diagram showing an electrical configuration of the electronic apparatus 2. In the example of FIG. 4, the electronic apparatus 2 includes a controller 30, a wireless communication unit 31, the display 32, the touch panel 33, a microphone 34, a receiver 35, an external speaker 36, the front imaging unit 37, the rear imaging unit 38, and a power supply unit 39. The apparatus case 20 accommodates these constituent elements of the electronic apparatus 2.

The controller 30 is a kind of computer, and is also a kind of electric circuit. The controller 30 includes, for example, a CPU (Central Processing Unit) 300, a DSP (Digital Signal Processor) 301, a storage 302, and a clock generator 303. The controller 30 controls the other constituent elements of the electronic apparatus 2 to enable the operations of the electronic apparatus 2 to be managed in a supervising manner. The controller 30 may further include, for example, a co-processor such as SoC (System-on-a-Chip), MCU (Micro Control Unit), and FPGA (Field-Programmable Gate Array). The controller 30 may cause the CPU 300 and the co-processor to cooperate with each other to perform various controls, or may perform various controls using one of the CPU 300 and the co-processor while switching between them.

The storage 302 includes a non-transitory recording medium that can be read by the CPU 300 and the DSP 301 such as a ROM (Read Only Memory) and a RAM (Random Access Memory). The storage 302 stores, for example, a main program and a plurality of application programs for controlling the electronic apparatus 2. The CPU 300 and the DSP 301 execute various programs in the storage 302, so that various functions of the controller 30 are achieved.

The clock generator 303 generates and outputs a clock signal. The clock generator 303 may also be called a clock generation circuit. The clock signal output by the clock generator 303 is supplied to, for example, the CPU 300 and the DSP 301. Each of the CPU 300 and the DSP 301 operates on the basis of the clock signal supplied from the clock generator 303. The clock signals supplied to the CPU 300 and the DSP 301 may have the same frequency or different frequencies.

The storage 302 may include a non-transitory computer-readable recording medium other than the ROM and the RAM. The storage 302 may include, for example, a small hard disk drive and an SSD (Solid State Drive). A part or a whole of the functions of the controller 30 may be achieved by hardware that does not require software for performing the functions.

The wireless communication unit 31 includes an antenna 310. The wireless communication unit 31 can receive through the antenna 310 via a base station, etc., for example, a signal from another mobile phone different from the electronic apparatus 2 or a communication apparatus such as a web server connected to the Internet. The wireless communication unit 31 can amplify and down-convert the signal received by the antenna 310 and output a resulting signal to the controller 30. The controller 30, for example, can demodulate the signal received from the wireless communication unit 31 to acquire information included in the received signal. The wireless communication unit 31 can also up-convert and amplify a transmission signal including, for example, a sound signal and wirelessly transmit the processed transmission signal from the antenna 310. The transmission signal from the antenna 310 is received, for example, via the base station, etc. by the mobile phone different from the electronic apparatus 2 or the communication apparatus such as the web server connected to the Internet.

The display 32 is, for example, a liquid crystal display panel or an organic EL display. The display 32 can display various pieces of information such as characters, symbols, and figures by control of the controller 30. The information displayed on the display 32 can be visually recognized by the user through the display area 21a of the cover panel 21.

The touch panel 33 can detect a manipulation on the display area 21a of the cover panel 21 with a manipulator such as the finger. The touch panel 33 is, for example, a projected capacitive touch panel. For example, when the user manipulates the display area 21a of the cover panel 21 using the manipulator such as the finger, a manipulation signal corresponding to the manipulation is input from the touch panel 33 to the controller 30. The controller 30 can identify details of the manipulation performed on the display area 21a on the basis of the manipulation signal from the touch panel 33, and perform processes corresponding to the identified details. The user can provide the various instructions to the electronic apparatus 2 also by manipulating the display area 21a with a manipulator other than the finger, such as pens for electrostatic touch panels including a stylus pen.

The microphone 34 can convert a sound input from the outside of the electronic apparatus 2 into an electrical sound signal and then output the sound signal to the controller 30. The sound from the outside of the electronic apparatus 2 is taken into the electronic apparatus 2 through the microphone hole 22 located on the front surface of the electronic apparatus 2, and is then input to the microphone 34.

The external speaker 36 is, for example, a dynamic speaker. The external speaker 36 can convert the electrical sound signal from the controller 30 into a sound and then output the sound. The sound output from the external speaker 36 is, for example, output to the outside of the electronic apparatus 2 through the speaker holes 24 located on the rear surface 200 of the apparatus case 20. The sound output from the speaker holes 24 is set to a volume, for example, such that the sound can be heard at a location distant from the electronic apparatus 2.

The receiver 35 is, for example, a dynamic speaker, and can output a received sound. The receiver 35 can convert an electric sound signal from the controller 30 into a sound, and then output the sound. The sound output from the receiver 35 is, for example, output from the receiver hole 23 located on the front surface of the electronic apparatus 2 to the outside of the electronic apparatus 2. The volume of the sound output from the receiver hole 23 is, for example, smaller than the volume of the sound output from the external speaker 36 through the speaker holes 24.

A piezoelectric vibrating element may be provided as a replacement for the receiver 35. The piezoelectric vibrating element is controlled by the controller 30, and vibrates on the basis of a sound signal such as a voice signal. The piezoelectric vibrating element is located, for example, on the rear surface of the cover panel 21. The piezoelectric vibrating element can vibrate the cover panel 21 with the own vibration on the basis of the sound signal. The vibration of the cover panel 21 is transmitted to the user as a sound by bringing the own ear closer to the cover panel 21. The receiver hole 23 is unnecessary if the piezoelectric vibrating element is provided as a replacement for the receiver 35.

The front imaging unit 37 includes, for example, an imaging lens and an image sensor. The front imaging unit 37 can capture a static image and a moving image on the basis of the control by the controller 30. The front imaging unit 37 can image an object in front of the electronic apparatus 2, that is, an object closer to the cover panel 21. The rear imaging unit 38 includes, for example, an imaging lens and an image sensor. The rear imaging unit 38 can capture a static image and a moving image on the basis of the control by the controller 30. The rear imaging unit 38 can image an object closer to the rear surface 200 of the apparatus case 20.

The power supply unit 39 can output the power for the electronic apparatus 2. The power supply unit 39 may also be called a power supply circuit. The power output from the power supply unit 39 is supplied to electronic components included in, for example, the controller 30 and the wireless communication unit 31 of the electronic apparatus 2. The power supply unit 39 includes a battery 41, a charge processing unit 40 that can charge the battery 41, and a temperature sensor 42 that detects a temperature of the battery 41. The power supply unit 39 can output the power from the battery 41 as the power for the electronic apparatus 2.

The charge processing unit 40 includes the power reception coil 400 and the charging connector 430. The charge processing unit 40 may also be called a charge processing circuit. The power supply unit 39 can output the external power supplied through the charging connector 430 as the power for the electronic apparatus 2. The charge processing unit 40 can charge the battery 41 on the basis of the power received by the power reception coil 400 from the power transmission coil 500 of the charging device 5. The charge processing unit 40 can charge the battery 41 on the basis of the external power supplied through the charging connector 430.

[Configuration of Charge Processing Unit]

Figure 5:
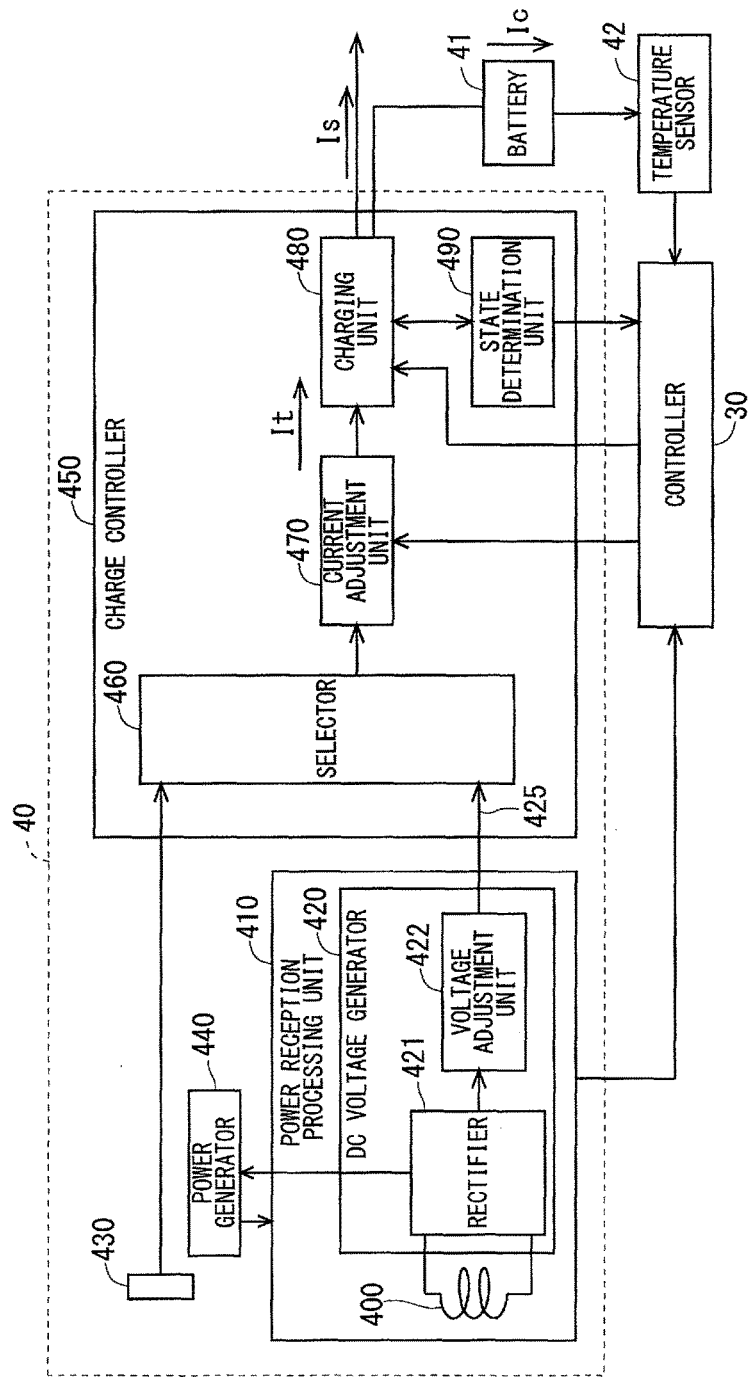
FIG. 5 illustrates an example of a configuration of a charge processing unit.

FIG. 5 illustrates an example of a configuration of the charge processing unit 40. In the example of FIG. 5, the charge processing unit 40 includes a power reception processing unit 410, the charging connector 430, a power generator 440, and a charge controller 450. The power reception processing unit 410 may also be called a power reception processing circuit. The power generator 440 may also be called a power generation circuit. The charge controller 450 may also be called a charge control circuit.

The power reception processing unit 410 includes the power reception coil 400 and a DC voltage generator 420. The DC voltage generator 420 may also be called a DC voltage generation circuit. The DC voltage generator 420 can generate a DC voltage 425 on the basis of the first electric power transmitted from the power transmission coil 500 of the charging device 5 to the power reception coil 400. The DC voltage generator 420 outputs the DC voltage 425 to enable the charge controller 450 to be supplied with a second electric power. In other words, the DC voltage generator 420 functions as a supplying unit that supplies a charging unit 480 of the charge controller 450 with the second electric power on the basis of the first electric power. The supplying unit may also be called a supplying circuit. The DC voltage generator 420 includes a rectifier 421 and a voltage adjustment unit 422. The rectifier 421 may also be called a rectifying circuit, and the voltage adjustment unit 422 may also be called a voltage adjustment circuit. The rectifier 421 can rectify the first electric power received by the power reception coil 400 to generate a DC voltage. The voltage adjustment unit 422 can step down the DC voltage generated by the rectifier 421 to output the DC voltage 425 to the charge controller 450. The power reception processing unit 410 can communicate with the charging device 5 on the basis of the Qi-based communication scheme through the power reception coil 400.

The power generator 440 can supply power to the power reception processing unit 410 on the basis of the first electric power received by the power reception coil 400.

The charge controller 450 can charge the battery 41 on the basis of the second electric power supplied from the DC voltage generator 420 or the external power supplied through the charging connector 430. The charge controller 450 can also supply a third electric power to circuits other than the power supply unit 39 in the electronic apparatus 2, on the basis of the second electric power supplied from the DC voltage generator 420 or the external power supplied through the charging connector 430. The charge controller 450 includes a selector 460, a current adjustment unit 470, the charging unit 480, and a state determination unit 490. The selector 460 may also be called a selection circuit, and the current adjustment unit 470 may also be called a current adjustment circuit. The charging unit 480 may also be called a charging circuit, and the state determination unit 490 may also be called a state determination circuit.

The selector 460 can select any one of the DC voltage 425 output by the DC voltage generator 420 and the external power (external voltage) supplied through the charging connector 430 and then output the selected one to the current adjustment unit 470. Specifically, when being supplied with the DC voltage 425 from the DC voltage generator 420 and not being supplied with the external power from the charging connector 430, the selector 460 can output the DC voltage 425 to the current adjustment unit 470. When not being supplied with the DC voltage 425 from the DC voltage generator 420 and being supplied with the external power from the charging connector 430, the selector 460 can output, to the current adjustment unit 470, the external power supplied through the charging connector 430. When being supplied with the DC voltage 425 from the DC voltage generator 420 and the external power from the charging connector 430, the selector 460 can, for example, output to the current adjustment unit 470 the external power supplied from the charging connector 430.

The current adjustment unit 470 can limit a supply current It supplied from the DC voltage generator 420 to the charging unit 480 on the basis of the upper limit set by the controller 30. The current adjustment unit 470 functions as a limiting unit that limits the supply current It. Specifically, the current adjustment unit 470 can limit the supply current It to be supplied to the charging unit 480 on the basis of the second electric power from the DC voltage generator 420 when the selector 460 outputs the DC voltage 425 supplied from the DC voltage generator 420. The current adjustment unit 470 can limit the supply current It to be supplied to the charging unit 480 on the basis of the external power, when the selector 460 outputs the external power supplied through the charging connector 430. In other words, the current adjustment unit 470 functions as a limiting circuit that limits the supply current It. The operations of the current adjustment unit 470 for limiting the supply current It will be described later in detail.

When the selector 460 outputs the DC voltage 425 supplied from the DC voltage generator 420, the charging unit 480 can output a system current Is to be supplied to the circuits other than the power supply unit 39 in the electronic apparatus 2 as well as a charging current Ic for charging the battery 41 on the basis of the second electric power supplied from the DC voltage generator 420. In contrast, when the selector 460 outputs the external power supplied through the charging connector 430, the charging unit 480 can supply the system current Is to the circuits other than the power supply unit 39 in the electronic apparatus 2 as well as charge the battery 41 with the charging current Ic on the basis of the external power supplied through the charging connector 430. The consumption current of the circuits other than the power supply unit 39 in the electronic apparatus 2 is the system current Is. The system current Is is, for example, supplied to, for example, electronic components included in the controller 30 and the wireless communication unit 31. A sum of the system current Is and the charging current Ic is almost equal to the supply current It. To simplify the following description, the sum of the system current Is and the charging current Ic is equal to the supply current It without considering the power to be consumed by the power supply unit 39 including the charging unit 480, etc.

The state determination unit 490 can determine a charging state of the battery 41. The state determination unit 490 can determine, for example, whether the battery 41 is being charged, whether the battery 41 is being discharged, or whether the battery 41 is fully charged. The state determination unit 490 can notify the controller 30 of the determined charging state of the battery 41 in response to a request from the controller 30. The state determination unit 490 can determine a charging state of the battery 41 on the basis of, for example, an operation status of the charging unit 480, a voltage of the battery 41, and the charging current Ic.

The controller 30 can control the operations of the charge controller 450 on the basis of, for example, a charging state of the battery 41 determined by the state determination unit 490, an operating state of the power reception processing unit 410, and the temperature of the battery 41 detected by the temperature sensor 42.

[Transmission of Electric Power from Power Transmission Coil to Power Reception Coil]

Figure 6:
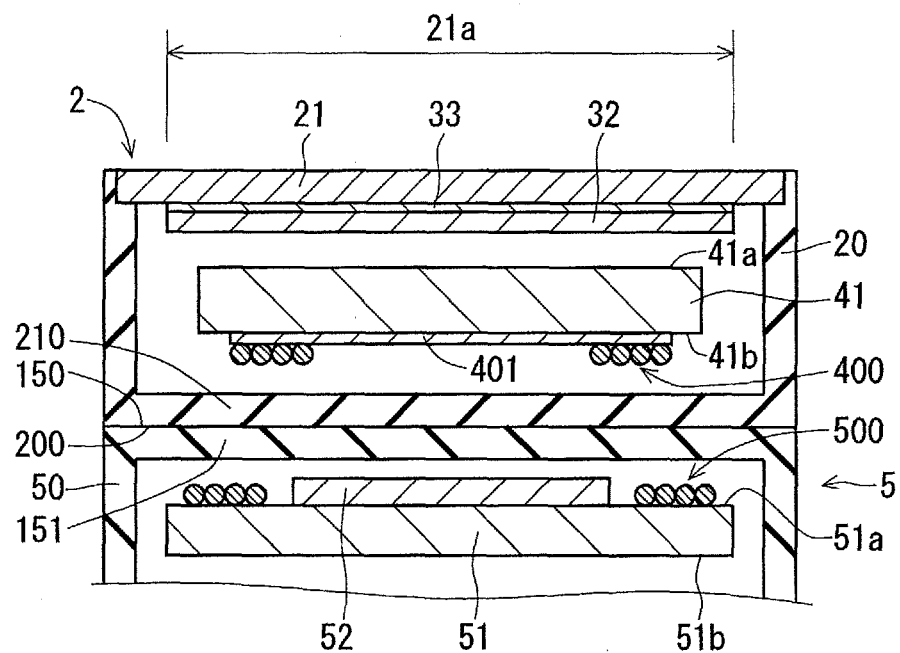
FIG. 6 schematically illustrates an example of a cross-sectional structure of the electronic apparatus and the contactless charging device.

The following will describe the transmission of the first electric power from the power transmission coil 500 to the power reception coil 400 in detail. FIG. 6 schematically illustrates an example of a cross-sectional structure of the charging device 5 and the electronic apparatus 2 placed on the charging device 5. In the example of FIG. 6, the power reception coil 400 and the power transmission coil 500 are each formed of a wound wire. The power reception coil 400 is disposed with a winding axis of the wire being substantially perpendicular to the rear surface 200 of the apparatus case 20 of the electronic apparatus 2 (a contact surface of the apparatus case 20 with the charging device 5). The power transmission coil 500 is disposed with the winding axis of the wire being substantially perpendicular to a mounting surface 150 of a case 50 of the charging device 5, on which the electronic apparatus 2 is placed.

In the apparatus case 20, the battery 41 is disposed to face the display 32. The battery 41 has a first main surface 41a that faces the display 32 and a second main surface 41b opposite the first main surface 41a. The power reception coil 400 is attached to a magnetic sheet 401. The magnetic sheet 401 is attached to the second main surface 41b of the battery 41. In other words, the power reception coil 400 is attached to the second main surface 41b of the battery 41 with the magnetic sheet 401 therebetween. The power reception coil 400 is disposed to face a rear surface portion 210 of the apparatus case 20. There is a spacing between the power reception coil 400 and the rear surface portion 210 of the apparatus case 20.

The charging device 5 is, for example, a charging stand with a magnet 52 for alignment with an electronic apparatus. In the case 50 of the charging device 5, a magnetic sheet 51 is provided to face a mounting portion 151 of the case 50, on which the electronic apparatus 2 is placed. The magnetic sheet 51 faces the mounting portion 151 of the case 50. The magnetic sheet 51 has a first main surface 51a that faces the mounting portion 151 of the case 50 and a second main surface 51b opposite the first main surface 51a. The power transmission coil 500 is attached to the first main surface 51a of the magnetic sheet 51. The power transmission coil 500 is disposed to face the mounting portion 151 of the case 50. There is a spacing between the power transmission coil 500 and the mounting portion 151 of the case 50. In a space at a central portion of the power transmission coil 500 is disposed a magnet 52. Specifically, the power transmission coil 500 is disposed so as to surround the magnet 52. The magnet 52 is attached to the magnetic sheet 51.

When the electronic apparatus 2 is placed on the charging device 5 such that the rear surface 200 of the apparatus case 20 contacts the mounting surface 150 of the case 50, the power reception coil 400 faces the power transmission coil 500. In this state, the power transmission coil 500 is energized, and the power transmission coil 500 generates a magnetic flux, so that the magnetic flux is interlinked with the power reception coil 400. As a result, an induced electromotive force is generated in the power reception coil 400. In other words, the power reception coil 400 receives the first electric power supplied from the power transmission coil 500. The charge processing unit 40 of the electronic apparatus 2 charges the battery 41 on the basis of the induced electromotive force generated in the power reception coil 400. Such contactless charging is referred to as "electromagnetic induction charging".

The magnetic sheet 401 and the magnetic sheet 51 can suppress leakage of the magnetic flux passing through the power reception coil 400 and the power transmission coil 500 to the outside. This can improve the electric power transmission efficiency (also referred to as "electric power feeding efficiency") in the transmission of the first electric power from the charging device 5 to the electronic apparatus 2.

Although the electronic apparatus 2 does not include any magnet for alignment with the charging device 5, some electronic apparatuses that support contactless charging include such a magnet. When such electronic apparatuses are charged by the charging device 5, the magnet for alignment with the electronic apparatus side and the magnet 52 on the charging device 5 side attract each other, so that the power reception coil 400 on the electronic apparatus side and the power transmission coil 500 on the charging device 5 side are aligned so as to appropriately face each other. This suppresses a reduction in electric power transmission efficiency due to a misalignment between the power reception coil 400 and the power transmission coil 500.

[Basic Operation of Electronic Apparatus System in Contactless Charging]

The following will describe basic operations of the electronic apparatus system 1 in contactless charging. Description is made here assuming that the charging connector 430 is not supplied with the external power.

When the electronic apparatus 2 is placed on the charging device 5 as illustrated in FIG. 6, the charging device 5 detects the electronic apparatus 2 and transmits the first electric power from the power transmission coil 500 to the power reception coil 400. Examples of a method for detecting the electronic apparatus 2 by the charging device 5 include a method for detecting proximity of the magnetic sheet 401 of the electronic apparatus 2 by a magnetic sensor (not illustrated) included in the charging device 5. The power generator 440 generates, from the received first electric power, the power to be supplied to the power reception processing unit 410. As a result of the communication between the power reception processing unit 410 supplied with the power and the charging device 5, initialization for contactless charging is performed between the electronic apparatus 2 and the charging device 5.

In the initialization for contactless charging, for example, an electric power transmission frequency to be used between the electronic apparatus 2 and the charging device 5 is decided. In the electronic apparatus system 1, a plurality of types of frequencies available for transmission of the first electric power are determined. As a result of the communication between the electronic apparatus 2 and the charging device 5, a frequency at which the electric power transmission efficiency is maximized is identified from among the plurality of types of frequencies. The identified frequency serves as an electric power transmission frequency. In initialization, the electronic apparatus 2 notifies the charging device 5 of the first electric power required for the DC voltage generator 420 to supply the charging unit 480 with the supply current It.

After the completion of the initialization, the DC voltage generator 420 of the power reception processing unit 410 generates the DC voltage 425 on the basis of the first electric power received from the power transmission coil 500 by the power reception coil 400, and then outputs the DC voltage 425 to the charge controller 450. The DC voltage generator 420 supplies the charge controller 450 with the second electric power on the basis of the first electric power received by the power reception coil 400.

In the charge controller 450, the selector 460 selects the DC voltage 425 from the DC voltage generator 420 and then outputs the DC voltage 425 to the current adjustment unit 470. The current adjustment unit 470 limits the supply current It to be supplied from the DC voltage generator 420 to the charging unit 480.

When the DC voltage 425 is greater than a first threshold, the charging unit 480 charges the battery 41 with the charging current Ic on the basis of the second electric power supplied from the DC voltage generator 420, and supplies the system current Is to the circuits other than the power supply unit 39 in the electronic apparatus 2. Meanwhile, when the DC voltage 425 is smaller than a second threshold, the charging unit 480 does not charge the battery 41. When the DC voltage 425 is smaller than the second threshold, the charging unit 480 discharges the battery 41, and supplies the system current Is to the circuits other than the power supply unit 39 in the electronic apparatus 2. The first threshold and the second threshold may be identical or different from each other. When the DC voltage 425 is equal to or greater than the first threshold, the charging unit 480 may charge the battery 41 on the basis of the second electric power supplied from the DC voltage generator 420. When the DC voltage 425 is equal to or smaller than the second threshold, the charging unit 480 may not charge the battery 41.

When charging the battery 41, the charging unit 480 operates in a current output mode or a constant voltage output mode on the basis of a voltage of the battery 41. The operations of the charging unit 480 in the current output mode and the constant voltage output mode will be hereinafter described in detail.

When the charging unit 480 charges the battery 41 and the voltage of the battery 41 is equal to or smaller than a third threshold, that is, the battery 41 is not close to a fully charged state, the charging unit 480 operates in the current output mode. When the charging unit 480 operates in the current output mode, the supply current It to be supplied from the DC voltage generator 420 to the charging unit 480 is equal to the upper limit set to the current adjustment unit 470. In other words, when the charging unit 480 operates in the current output mode, it can be said that the current adjustment unit 470 always limits the supply current It. Since the supply current It supplied to the charging unit 480 in the current output mode is constant, a sum of the charging current Ic and the system current Is that are output by the charging unit 480 is constant. The charging unit 480 in the current output mode supplies the system current Is to the circuits other than the power supply unit 39 in the electronic apparatus 2 to supply the third electric power to the circuits. The charging unit 480 in the current output mode also supplies the battery 41 with, as the charging current Ic, a current obtained by excluding the system current Is from the supply current It which is supplied from the DC voltage generator 420. When the system current Is is constant, the charging current Ic increases as the supply current It is greater.

The controller 30 sets the upper limit of the supply current It in the current adjustment unit 470. The supply current It to be supplied to the charging unit 480 that operates in the current output mode is equal to the upper limit set to the current adjustment unit 470. In other words, the controller 30 functions as a setting unit that sets the supply current It to be supplied to the charging unit 480 in the current output mode. The controller 30 can set the supply current It by setting the upper limit of the supply current It in the current adjustment unit 470 from among a plurality of types of current values. The supply current It is set, for example, from among 200 mA, 400 mA, 600 mA, and 800 mA.

When the battery 41 is charged so that the voltage of the battery 41 is greater than the third threshold, that is, when the battery 41 is close to the fully charged state, the charging unit 480 operates in the constant voltage output mode. The charging unit 480 in the constant voltage output mode generates a constant output voltage on the basis of the second electric power supplied from the DC voltage generator 420, and supplies the output voltage to the battery 41, thereby charging the battery 41. The charging current Ic flowing through the battery 41 decreases as the battery 41 is closer to being fully charged. After that, when the charging current Ic flowing through the battery 41 gets smaller than a fourth threshold, the charging unit 480 ends charging of the battery 41.

The controller 30 can set the upper limit of the supply current It from among a plurality of types of current values. The upper limit of the supply current It to be supplied to the charging unit 480 in the constant voltage output mode is set, for example, from among 200 mA, 400 mA, 600 mA, and 800 mA. The upper limit may be the same as the setting value of the supply current It to be supplied to the charging unit 480 in the constant voltage output mode or a different value. Since the charging current Ic to be output by the charging unit 480 in the constant voltage output mode is sufficiently less than the charging current Ic to be output by the charging unit 480 in the current output mode, the supply current It to be supplied to the charging unit 480 in the constant voltage output mode is frequently less than the set upper limit.

When the charging unit 480 starts charging the battery 41 and the voltage of the battery 41 is greater than the third threshold, that is, the battery 41 is close to the fully charged state, the charging unit 480 operates in the constant voltage output mode from the start of charging.

The controller 30 sets the upper limit of the supply current It according to the temperature of the battery 41 detected by the temperature sensor 42. The controller 30 reduces the upper limit of the supply current It as the temperature of the battery 41 detected by the temperature sensor 42 is higher. This suppresses increase in the charging current Ic flowing through the battery 41. Increase in the temperature of the battery 41 can also be suppressed.

When charging of the battery 41 is started and then continues for a predetermined period of time or more, the state determination unit 490 determines that the battery 41 is being charged. That is, the state determination unit 490 does not determine that the battery 41 is being charged immediately after the start of charging the battery 41. When the charging current Ic flowing through the battery 41 is smaller than the fourth threshold, the state determination unit 490 determines that the battery 41 is fully charged. When the charging unit 480 does not charge the battery 41, the state determination unit 490 determines that the battery 41 is being discharged. Until the state determination unit 490 determines that the battery 41 is being charged after the charging unit 480 starts charging the battery 41, that is, until charging of the battery 41 continues for a predetermined period of time or more, the state determination unit 490 determines that the battery 41 is being discharged. Thus, the state determination unit 490 determines that the battery 41 is being discharged immediately after the start of charging the battery 41.

As described above, in the electronic apparatus 2, the battery 41 is charged on the basis of the first electric power transmitted from the charging device 5.

[Charging Operations of Electronic Apparatus with Supplied Electric Power Being Scarce]

When the charging device 5 supplies the DC voltage generator 420 with the first electric power enough to supply the supply current It to the charging unit 480, the battery 41 is charged on the basis of the first electric power. In contrast, when the charging device 5 does not supply the DC voltage generator 420 with the first electric power enough to supply the supply current It to the charging unit 480, the battery 41 is not charged on the basis of the first electric power.

The maximum value of the first electric power capable of being supplied from the charging device 5 to the electronic apparatus 2 sometimes decreases depending on a positional relationship between the power transmission coil 500 and the power reception coil 400. For example, the intercoil coupling between the power transmission coil 500 and the power reception coil 400 sometimes weakens as the distance between the center of the power transmission coil 500 and the center of the power reception coil 400 is greater. Consequently, the first electric power capable of being supplied from the charging device 5 to the electronic apparatus 2 sometimes decreases. Thus, it is preferred that the distance between the center of the power transmission coil 500 and the center of the power reception coil 400 is less to supply the electronic apparatus 2 with the first electric power that is greater as the supply current It to be supplied from the DC voltage generator 420 to the charging unit 480 is greater.

Figure 7:
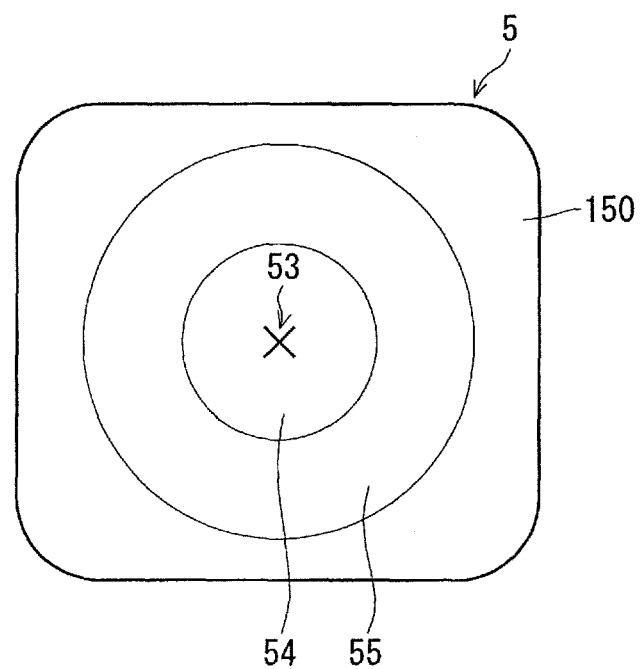
FIG. 7 is a view for describing an example of a chargeable range of a battery in the charging device.

FIG. 7 is a view for describing an example of a chargeable range of the battery 41 on the mounting surface 150 of the charging device 5. FIG. 7 illustrates a cross 53 as a position overlapping the center position of the power transmission coil 500 in a perspective plane with respect to the mounting surface 150. FIG. 7 also illustrates, on the mounting surface 150, a range 54 in which the charging device 5 can charge the battery 41 when the setting value of the supply current It is 800 mA, and a range 55 in which the charging device 5 can charge the battery 41 when the setting value of the supply current It is 400 mA. The range 54 indicates a chargeable range of the battery 41 when the electronic apparatus 2 is placed on the charging device 5 so that the center of the power reception coil 400 is within the range 54 in a perspective plane with respect to the mounting surface 150. Similarly, the range 55 indicates a chargeable range of the battery 41 when the electronic apparatus 2 is placed on the charging device 5 so that the center of the power reception coil 400 is within the range 55 in a perspective plane with respect to the mounting surface 150.

Since the intercoil coupling between the power transmission coil 500 and the power reception coil 400 is intensified when the center of the power reception coil 400 is within the range 54, the battery 41 can be charged by supplying the supply current It up to 800 mA. When the supply current It up to 400 mA is supplied, the intercoil coupling may be smaller than that when the supply current It up to 800 mA is supplied. Thus, the chargeable range 55 to which the supply current It up to 400 mA is supplied is wider than the chargeable range 54 to which the supply current It up to 800 mA is supplied.

The battery 41 may start to be charged with the first electric power capable of being supplied from the charging device 5 to the electronic apparatus 2 less sufficient, depending on a position of the electronic apparatus 2 to be placed on the charging device 5. When the electronic apparatus 2 starts charging the battery 41 with the first electric power capable of being supplied from the charging device 5 less sufficient, the charging may be interrupted. For example, when the electronic apparatus 2 is placed on the mounting surface 150 so that the center of the power reception coil 400 is outside of the range 54 and within the range 55, if the setting value of the supply current It is equal to or lower than 400 mA, the charging device 5 can charge the electronic apparatus 2. Then, when the setting value of the supply current It increases to 800 mA during the charging, the charging is interrupted because the first electric power cannot be supplied sufficiently. The operations of interrupting the charging due to increase in the supply current It will be hereinafter described in detail.

When the charging device 5 supplies the electronic apparatus 2 with the first electric power sufficient enough for the DC voltage generator 420 to supply the supply current It, the DC voltage 425 output by the DC voltage generator 420 becomes greater than the first threshold, so that the supply current It is supplied to the charging unit 480 and the charging of the battery 41 is started. The current adjustment unit 470 reduces the supply current It as the temperature of the battery 41 is higher. Thus, when the temperature of the battery is higher upon start of charging, the supply current It may be set to a smaller value (for example, 400 mA) than the settable maximum value (for example, 800 mA). Here, when the DC voltage generator 420 supplies the charging unit 480 with the first electric power sufficient enough to supply the supply current It up to 400 mA, the charging unit 480 can continue to charge the battery 41 after starting to charge it.

When the temperature of the battery 41 decreases during charging of the battery 41 more than when the battery 41 starts to be charged, the setting value of the supply current It may be increased. For example, the setting value of the supply current It may be increased from 400 mA upon start of charging to 800 mA that is the settable maximum value. Here, when the DC voltage generator 420 supplies the charging unit 480 with the first electric power sufficient enough to supply 800 mA of the supply current It, charging of the battery 41 is continued. In contrast, when the DC voltage generator 420 does not supply the charging unit 480 with the first electric power necessary to supply 800 mA of the supply current It, the DC voltage 425 output by the DC voltage generator 420 greatly decreases, and becomes smaller than the second threshold. Here, charging of the battery 41 is interrupted.

When the charging unit 480 operates in the current output mode, the supply current It to be supplied to the charging unit 480 is equal to the upper limit set to the current adjustment unit 470. Thus, when the temperature of the battery 41 decreases, increase in the upper limit of the supply current It may increase the supply current It. When the charging unit 480 operates in the constant voltage output mode and the charging current Ic is smaller than the upper limit set to the supply current It, even if the upper limit of the supply current It increases according to decrease in the temperature of the battery 41 but the system current Is does not increase, the supply current It does not increase.

As such, when the battery 41 starts to be charged while the DC voltage generator 420 does not supply the first electric power sufficient enough to supply the supply current It, if the supply current It increases during the charging, the charging may be stopped because the charging device 5 cannot supply the electronic apparatus 2 with the first electric power sufficiently.

Thus, even when the supply current It increases during charging of the battery 41, the electronic apparatus 2 performs charging processes enabling the charging to be hardly interrupted. The following will describe these charging processes in detail.

[Details of Charging Processes]

FIG. 8 illustrates a flowchart showing an example of the charging processes in the electronic apparatus 2. When the electronic apparatus 2 is placed on the charging device 5, in Step S1, the power reception processing unit 410 starts communication with the charging device 5. After starting communication with the charging device 5, the power reception processing unit 410 outputs a communication start signal to the controller 30. The communication start signal is input to, for example, an interrupt terminal of the CPU 300 of the controller 30. Upon receipt of the communication start signal, the controller 30 recognizes that the electronic apparatus 2 is placed on the charging device 5. Upon input of the communication start signal to the interrupt terminal, the CPU 300 of the controller 30 executes interrupt processing of starting measuring a predetermined period of time. The predetermined period of time is set to, for example, several seconds to several tens of seconds. As a result of the communication between the power reception processing unit 410 and the charging device 5, initialization for contactless charging is performed between the electronic apparatus 2 and the charging device 5.

Next in Step S2, the controller 30 controls the current adjustment unit 470 to set the supply current It to the settable maximum value (for example, 800 mA). The controller 30 here sets the supply current It to the settable maximum value regardless of the temperature of the battery 41 detected by the temperature sensor 42. Specifically, the controller 30 sets the upper limit of the supply current It in the current adjustment unit 470 to the settable maximum value. When the charging unit 480 operates in the current output mode, the supply current It becomes equal to the set upper limit. In other words, the supply current It to be supplied to the charging unit 480 in the current output mode is set to the settable maximum value.

When the charging unit 480 operates in the constant voltage output mode, the supply current It is frequently smaller than the set upper limit due to the lower charging current Ic. Here, the supply current It does not increase even when the upper limit of the supply current It increases. Thus, when the charging unit 480 operates in the constant voltage output mode, the controller 30 may not set the supply current It to the settable maximum value. For example, when the charging unit 480 operates in the constant voltage output mode, the controller 30 may set the upper limit of the supply current It on the basis of the temperature of the battery 41.

Upon supply of the first electric power from the power transmission coil 500 to the power reception coil 400 and completion of the initialization, the power reception processing unit 410 generates the DC voltage 425 on the basis of the first electric power received by the power reception coil 400 and then outputs the DC voltage 425. When the DC voltage 425 is greater than the first threshold, in Step S3, the charging unit 480 starts charging the battery 41. In Step S3, the charging unit 480 outputs the charging current Ic for charging the battery 41 from the supply current It supplied on the basis of the first electric power. The charging unit 480 also supplies the circuits other than the power supply unit 39 in the electronic apparatus 2 with the system current Is from the supply current It supplied on the basis of the first electric power.

After Step S3, upon completion of measuring a predetermined period of time in the CPU 300, that is, after a lapse of a predetermined period of time from the receipt of the communication start signal, in Step S4, the controller 30 determines whether the battery 41 is continuously charged. Specifically, the controller 30 checks the determination result of the charging state in the state determination unit 490. When the state determination unit 490 determines that the battery 41 is being charged, the controller 30 determines that the battery 41 is continuously charged. When the state determination unit 490 determines that the battery 41 is being discharged, meanwhile, the controller 30 determines that the battery 41 is not continuously charged.

As described above, the state determination unit 490 determines that the battery 41 is being charged if charging of the battery 41 continues for a predetermined period of time or more since its start. When the state determination unit 490 determines that the battery 41 is being charged after the start of charging the battery 41, it can determine that the battery 41 is continuously charged. Meanwhile, when charging of the battery 41 is stopped immediately after the start of charging the battery 41, the state determination unit 490 does not determine that the battery 41 is being charged but determines that the battery 41 is being discharged. When the state determination unit 490 determines that the battery 41 is being discharged after the start of charging the battery 41, accordingly, it can determine that the battery 41 is not continuously charged. When it is determined in Step S4 that the battery 41 is not continuously charged, Step S7 is executed. In Step S7, the controller 30 stops charging the battery 41.

In this manner, the controller 30 functions as a determination unit that determines whether the battery 41 is continuously charged. The initialization between the electronic apparatus 2 and the charging device 5 completes within, for example, a second, and thus, measuring of a predetermined period of time in the controller 30 completes after a while from the start of charging the battery 41. In other words, Step S4 is executed after a while from the start of charging the battery 41.

When it is determined in Step S4 that the battery 41 is continuously charged, Step S5 is executed. In Step S5, the controller 30 sets the supply current It according to a temperature of the battery 41. Specifically, the controller 30 sets the supply current It lower by reducing the upper limit of the supply current It in the current adjustment unit 470 as the temperature of the battery 41 detected by the temperature sensor 42 is higher. For example, when the temperature of the battery 41 detected by the temperature sensor 42 is equal to or higher than a predetermined value, the controller 30 reduces the supply current It from 800 mA set upon start of charging to 200 mA. Here, the current adjustment unit 470 may set the supply current It according to the temperature of the battery 41, after a lapse of a predetermined time since the controller 30 determines that the battery 41 is continuously charged. Then in Step S6, charging of the battery 41 is continued. The controller 30 increases the supply current It when the temperature of the battery 41 detected by the temperature sensor 42 becomes lower.

As described above, the controller 30 sets the supply current It to the settable maximum value regardless of the temperature of the battery 41 detected by the temperature sensor 42. Thus, when the electric power feeding efficiency between the charging device 5 and the electronic apparatus 2 is inferior, the charge processing unit 40 cannot supply the set supply current It to the charging unit 480. Conversely speaking, when the electric power feeding efficiency is superior, the charge processing unit 40 can supply the set supply current It to the charging unit 480 and start the charging. In other words, the charge processing unit 40 can start the charging with the electric power feeding efficiency being superior. Thus, even when the temperature of the battery 41 detected by the temperature sensor 42 becomes lower after starting charging the battery 41 and the upper limit of the supply current It is set greater, the charge processing unit 40 can supply the charging unit 480 with the set supply current It and charge the battery 41. Consequently, the charging is hardly interrupted.

Although the controller 30 sets the supply current It to the settable maximum value in Step S2 in the description, it may set the supply current It to a value larger than the settable minimum value. Here, increase in the supply current It during charging of the battery 41 can prevent the charging from being interrupted.

Embodiment 2

Embodiment 1 describes a case where the temperature of the battery 41 decreases during charging of the battery 41 and the supply current It increases. Meanwhile, there are cases where the system current Is increases during charging of the battery 41 and the supply current It increases. Here, the charging may also be interrupted because the charging device 5 cannot supply the electronic apparatus 2 with the first electric power sufficient enough to supply the supply current It. This point will be hereinafter described.

When the charging unit 480 operates in the current output mode upon start of charging the battery 41, the charging unit 480 supplies the battery 41 with, as the charging current Ic, a current obtained by excluding the system current Is from the supply current It which is adjusted by the current adjustment unit 470. When the system current Is increases during the charging, the charging unit 480 in the current output mode supplies an increment of the system current Is by reducing the charging current Ic. Thus, when the charging unit 480 operates in the current output mode, the supply current It does not increase even with increase in the system current Is.

When the voltage of the battery 41 is greater than the third threshold upon start of charging, that is, when the battery 41 is close to the fully charged state, the charging unit 480 operates in the constant voltage output mode from the start of charging. Since the controller 30 sets the upper limit of the supply current It to be supplied to the charging unit 480 operating in the constant voltage output mode, the supply current It is limited and does not exceed the upper limit. Since the charging current Ic when the charging unit 480 operates in the constant voltage output mode is much less than that when the charging unit 480 operates in the current output mode, the supply current It is frequently smaller than the upper limit. When the supply current It is smaller than the upper limit and the system current Is increases, the supply current It increases. When the supply current It increases during charging of the battery 41, the charging may be interrupted because the charging device 5 cannot supply the electronic apparatus 2 with the first electric power sufficient enough to supply the supply current It. The system current Is may increase when the operation of the electronic apparatus 2 is changed. The system current Is increases, for example, when the electronic apparatus 2 receives a call during charging of the battery 41.

In Embodiment 2, even when the supply current It increases according to increase in the system current Is during charging of the battery 41, the electronic apparatus 2 performs the charging processes enabling the charging to be hardly interrupted. The details will be described hereinafter.

FIG. 9 illustrates a flowchart showing an example of the charging processes in the electronic apparatus 2. When the electronic apparatus 2 is placed on the charging device 5, in Step S21, the power reception processing unit 410 starts communication with the charging device 5 and performs initialization for contactless charging. Since this process is the same as Step S1 in FIG. 8 described according to Embodiment 1, the detailed description will be omitted.

Next in Step S22, the controller 30 controls the current adjustment unit 470 to set the upper limit of the supply current It according to the temperature of the battery 41 detected by the temperature sensor 42. The controller 30 sets the upper limit of the supply current It lower as the temperature of the battery 41 detected by the temperature sensor 42 is higher. For example, when the temperature of the battery 41 detected by the temperature sensor 42 is equal to or higher than a predetermined value, the upper limit of the supply current It is set to 400 mA smaller than 800 mA that is the settable maximum value.

Next in Step S23, the controller 30 changes an operation of a predetermined circuit to which the system current Is is supplied so that the consumption current of the predetermined circuit increases to increase the system current Is. For example, the controller 30 to which the system current Is is supplied increases the own consumption current, so that the system current Is increases. The controller 30 increases the own consumption current, for example, by increasing a frequency of the clock signal to be generated by the clock generator 303. The controller 30 can set the frequency of the clock signal to be generated by the clock generator 303, for example, from among a plurality of kinds of frequencies. Thus, a simple method of increasing the frequency of the clock signal can increase the system current Is through increase in the consumption current of the predetermined circuit to which the system current Is is supplied.

Although increasing the frequency of the clock signal to be generated by the clock generator 303 increases the system current Is in the example above, the system current Is may be increased by a method other than increasing the frequency of the clock signal. For example, the controller 30 may increase the system current Is by executing a program for increasing the own consumption current. Alternatively, the controller 30 may increase the system current Is by changing the operation of the predetermined circuit to which the system current Is is supplied and which is different from the controller 30 so that the consumption current of the predetermined circuit increases.

Next in Step S24, the charging unit 480 charges the battery 41 with the charging current Ic. Then in Step S25, the controller 30 determines whether the battery 41 is continuously charged. When it is determined in Step S25 that the battery 41 is not continuously charged, Step S28 is executed. In Step S28, the controller 30 stops charging the battery 41. Since the processes of Steps S24, S25, and S28 are the same as those in Steps S3, S4, and S7 in FIG. 8 described according to Embodiment 1, respectively, the detailed description thereof will be omitted.

When it is determined in Step S25 that the battery 41 is continuously charged, Step S26 is executed. In Step S26, the controller 30 restores the operation of the predetermined circuit that is caused to increase the system current Is. When the frequency of the clock signal to be generated by the clock generator 303 is increased in Step S23, the frequency is restored. Then in Step S27, charging of the battery 41 is continued.

As such in Embodiment 2, the operation of the predetermined circuit to which the system current Is is supplied is changed to increase the system current Is when the charging unit 480 starts charging the battery 41. Upon start of charging the battery 41, when the battery 41 is close to the fully charged state and the charging current Ic is very low, the charge processing unit 40 can intentionally increase the supply current It. Thus, when the electric power feeding efficiency between the charging device 5 and the electronic apparatus 2 is inferior, the charging unit 480 is not supplied with the necessary electric power. From another perspective, when the electric power feeding efficiency between the charging device 5 and the electronic apparatus 2 is superior, the battery 41 starts to be charged after the charging unit 480 is supplied with the necessary supply current It. Thus, even when the battery 41 is close to the fully charged state and the charging current Ic is very low upon start of charging the battery 41, the charge processing unit 40 can start charging the battery 41 during the superior electric power feeding efficiency. When it is determined that the battery 41 is continuously charged after starting to be charged, the operation of the predetermined circuit that is caused to increase the system current Is is restored. Even when the system current Is increases upon start of charging, the charge processing unit 40 can charge the battery 41 by supplying the charging unit 480 with the necessary current. Consequently, the charging is hardly interrupted even when the battery 41 upon start of charging is close to the fully charged state.

When the charging unit 480 operates in the constant voltage output mode in charging the battery 41, the controller 30 may increase the system current Is so that the supply current It reliably increases to the set upper limit. For example, the state determination unit 490 detects the supply current It supplied to the charging unit 480. The controller 30 increases the frequency of the clock signal to be generated by the clock generator 303 until the supply current It detected by the state determination unit 490 upon start of charging reaches the upper limit. Since the charge processing unit 40 can start the charging during the superior electric power feeding efficiency, the charging is more hardly interrupted.

In the examples above, the charge processing unit 40 increases the system current Is regardless of whether the operation of the charging unit 480 is in the current output mode or in the constant voltage output mode upon start of charging. When the charging unit 480 operates in the current output mode, the supply current It does not increase even with increase in the system current Is. Thus, the charge processing unit 40 may increase the system current Is only when the charging unit 480 operates in the constant voltage output mode upon start of charging. This can prevent a wasteful increase in the system current Is and reduce the power consumption of the electronic apparatus 2.

Embodiment 3

Embodiment 3 in combination with the charging processes of Embodiments 1 and 2 enables charging of the battery 41 to be hardly interrupted both when decrease in the temperature of the battery 41 during charging of the battery 41 increases the supply current It and when increase in the system current Is increases the supply current It.

Figure 10:
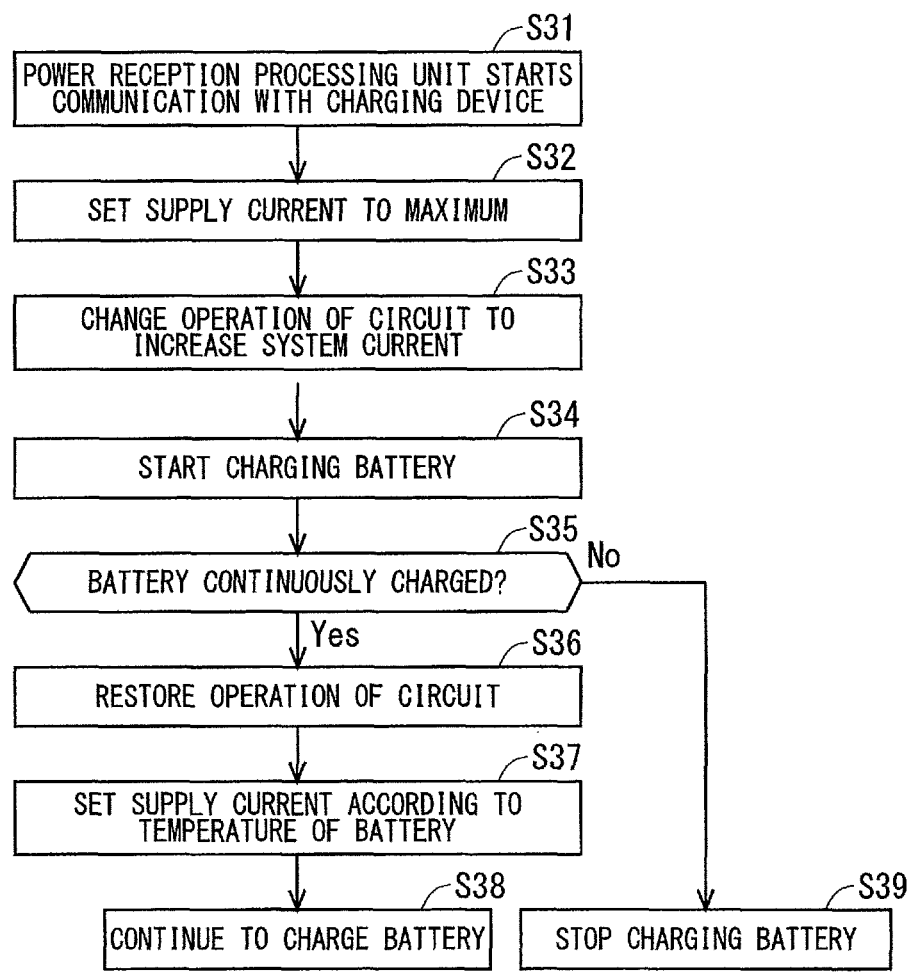
FIG. 10 illustrates a flowchart showing an example of operations of the electronic apparatus.

FIG. 10 illustrates a flowchart showing an example of the charging processes in the electronic apparatus 2. First in Step S31, the power reception processing unit 410 starts communication with the charging device 5 and performs initialization for contactless charging.

Next in Step S32, the controller 30 controls the current adjustment unit 470 to set the supply current It to be supplied to the charging unit 480 to the settable maximum value (for example, 800 mA), regardless of the temperature of the battery 41 detected by the temperature sensor 42. The current adjustment unit 470 may set the supply current It to not the settable maximum value but a value larger than the settable minimum value.

Next in Step S33, the controller 30 changes an operation of the predetermined circuit to which the system current Is is supplied so that the consumption current of the predetermined circuit increases to increase the system current Is. The controller 30 increases the own consumption current, for example, by increasing the frequency of the clock signal to be generated by the clock generator 303, so that the system current Is increases. The controller 30 may increase the system current Is by a predetermined amount. When the charging unit 480 operates in the constant voltage output mode, the controller 30 may increase the system current Is so that the supply current It increases to the set upper limit. In Step S34 after Step S33, the battery 41 is charged on the basis of the supply current It.

When the controller 30 determines in Step S35 that the battery 41 is not continuously charged, Step S39 is executed. In Step S39, the controller 30 stops charging the battery 41.

When the controller 30 determines in Step S36 that the battery 41 is continuously charged, Step S36 is executed. In Step S36, the controller 30 restores the operation of the predetermined circuit that is caused to change its operation to increase the system current Is. When the frequency of the clock signal to be generated by the clock generator 303 is increased in Step S33, the frequency is restored. Next in Step S37, the controller 30 controls the current adjustment unit 470 to reduce the setting value of the supply current It as the temperature of the battery 41 detected by the temperature sensor 42 is higher. Then in Step S38, charging of the battery 41 is continued.

In Embodiment 3, when the charging unit 480 starts charging the battery 41, the controller 30 sets the setting value of the supply current It to the settable maximum value regardless of the temperature of the battery 41 detected by the temperature sensor 42, and further changes the operation of the predetermined circuit to which the system current Is is supplied so that the system current Is increases. Thus, the charge processing unit 40 can start the charging with the electric power feeding efficiency being far superior. When it is determined that the battery 41 is continuously charged after start of the charging, the operation of the predetermined circuit that is caused to change its operation to increase the system current Is is restored, and the setting value of the supply current It is reduced as the temperature of the battery 41 is higher. Thus, even when decrease in the temperature of the battery 41 or increase in the system current Is increases the supply current It after start of the charging, the charge processing unit 40 can charge the battery 41 by supplying the charging unit 480 with the necessary current. Thus, the charging is more hardly interrupted.

Although the examples above describe cases where the technique according to the present disclosure is applied to mobile phones such as smartphones, the technique is applicable to other electronic apparatuses each including a chargeable battery. The technique according to the present disclosure is applicable to, for example, tablet terminals or wearable electronic apparatuses wore on the wrist, etc.

Although the electronic apparatus is described in detail above, the foregoing description is in all aspects illustrative and does not restrict the present disclosure. The modifications are applicable in combination as long as they are consistent with each other. It is therefore understood that numerous modifications that have not yet been exemplified can be devised without departing from the scope of the disclosure.

EXPLANATION OF REFERENCE SIGNS 2 electronic apparatus
5 contactless charging device 30 controller (setting unit, controller)
41 battery
42 temperature sensor (temperature detector)
303 clock generator (predetermined circuit)
400 power reception coil
420 DC voltage generator (supplying unit)
470 current adjustment unit (limiting unit)
480 charging unit
490 state determination unit (determination unit)
500 power transmission coil

The invention claimed is:

1. An electronic apparatus, comprising:
a battery;
a temperature detector configured to detect a temperature of the battery;
a charging unit configured to charge the battery;
a power reception coil configured to receive a first electric power transmitted in a contactless manner from a power transmission coil of a contactless charging device;
a supplying unit configured to supply the charging unit with a second electric power on the basis of the first electric power;
a setting unit configured to set a supply current to be supplied from the supplying unit to the charging unit;
a determination unit configured to determine whether the battery is continuously charged,
wherein the setting unit sets the supply current to a value larger than a settable minimum value regardless of the temperature when the charging unit starts charging the battery on the basis of the second electric power, and reduces the supply current as the temperature is higher when the determination unit determines that the battery is continuously charged; and
a predetermined circuit to be controlled by the setting unit,
wherein the charging unit supplies the predetermined circuit with a third electric power, and the setting unit changes an operation of the predetermined circuit so that a consumption current of the predetermined circuit increases to set the supply current to the value larger than the settable minimum value regardless of the temperature when the charging unit starts charging the battery on the basis of the second electric power, and then restores the operation of the predetermined circuit when the determination unit determines that the battery is continuously charged.

2. The electronic apparatus according to claim 1,
wherein the setting unit sets the supply current to a settable maximum value regardless of the temperature when the charging unit starts charging the battery on the basis of the second electric power.

3. The electronic apparatus according to claim 1, further comprising
a limiting unit configured to limit the supply current to be supplied from the supplying unit to the charging unit,
wherein the setting unit increases, when changing the operation of the predetermined circuit, the consumption current of the predetermined circuit so that the supply current increases to an upper limit of the supply current, the upper limit being set in the limiting unit.

4. The electronic apparatus according to claim 1,
wherein the predetermined circuit comprises a generator configured to generate a clock signal, and
the setting unit increases a frequency of the clock signal to increase the consumption current when the charging unit starts charging the battery on the basis of the second electric power.

5. An electronic apparatus, comprising:
a predetermined circuit;
a battery;
a charging unit configured to charge the battery and supply the predetermined circuit with a first electric power;
a power reception coil configured to receive a second electric power transmitted in a contactless manner from a power transmission coil of a contactless charging device;
a supplying unit configured to supply the charging unit with a third electric power on the basis of the second electric power;
a controller configured to control the predetermined circuit; and
a determination unit configured to determine whether the battery is continuously charged,
wherein the controller changes an operation of the predetermined circuit so that a consumption current of the predetermined circuit increases when the charging unit starts charging the battery on the basis of the third electric power, and then restores the operation of the predetermined circuit when the determination unit determines that the battery is continuously charged.

6. The electronic apparatus according to claim 5, further comprising
a limiting unit configured to limit a supply current to be supplied from the supplying unit to the charging unit,
wherein the controller increases, when changing the operation of the predetermined circuit, the consumption current of the predetermined circuit so that the supply current increases to an upper limit of the supply current, the upper limit being set in the limiting unit.

7. The electronic apparatus according to claim 5,
wherein the predetermined circuit comprises a generator configured to generate a clock signal, and
the controller increases a frequency of the clock signal to increase the consumption current when the charging unit starts charging the battery on the basis of the third electric power.

8. A method for charging a battery on the basis of a first electric power transmitted in a contactless manner from a contactless charging device, the method being performed by an electronic apparatus comprising the battery, the method comprising:
detecting a temperature of the battery;
receiving the first electric power from a power transmission coil of the contactless charging device by a power reception coil of the electronic apparatus;
supplying a charging unit with a second electric power on the basis of the first electric power, the charging unit charging the battery;
setting a supply current to be supplied to the charging unit; and
determining whether the battery is continuously charged,
wherein the supply current is set to a value larger than a settable minimum value regardless of the temperature when the battery starts to be charged on the basis of the second electric power, and the supply current is reduced as the temperature is higher when it is determined that the battery is continuously charged, and
wherein an operation of a predetermined circuit is changed so that a consumption current of the predetermined circuit increases when the battery starts to be charged on the basis of the third electric power, and then the operation of the predetermined circuit is restored when it is determined that the battery is continuously charged.

9. A method for charging a battery on the basis of a first electric power transmitted in a contactless manner from a contactless charging device, the method being performed by an electronic apparatus comprising the battery, the method comprising:

supplying a predetermined circuit of the electronic apparatus with a second electric power;

receiving the first electric power from a power transmission coil of the contactless charging device by a power reception coil of the electronic apparatus;

supplying a charging unit with a third electric power on the basis of the first electric power, the charging unit charging the battery;

controlling the predetermined circuit; and determining whether the battery is continuously charged, wherein an operation of the predetermined circuit is changed so that a consumption current of the predetermined circuit increases when the battery starts to be charged on the basis of the third electric power, and then the operation of the predetermined circuit is restored when it is determined that the battery is continuously charged.

* * * * *